US012655964B2

(12) United States Patent
Lu et al.

(10) Patent No.: US 12,655,964 B2
(45) Date of Patent: Jun. 16, 2026

(54) LIGHTING DEVICE WITH EASY INSTALLATION FUNCTIONALITY

(71) Applicant: Shinegrow (Xiamen) Lighting Technology Co., LTD., Fujian (CN)

(72) Inventors: Fuxing Lu, Fujian (CN); Weibiao Zhong, Fujian (CN)

( * ) Notice: Subject to any disclaimer, the term of this patent is extended or adjusted under 35 U.S.C. 154(b) by 152 days.

(21) Appl. No.: 18/934,263

(22) Filed: Nov. 1, 2024

(65) Prior Publication Data

US 2025/0216062 A1 Jul. 3, 2025

(30) Foreign Application Priority Data

Dec. 28, 2023 (CN) ........................ 202323624412.6

(51) Int. Cl.

*F21V 21/008* (2006.01)
*F21V 21/02* (2006.01)
*F21V 23/06* (2006.01)

(52) U.S. Cl.

CPC ............ *F21V 21/008* (2013.01); *F21V 21/02* (2013.01); *F21V 23/06* (2013.01)

(58) Field of Classification Search

CPC ...... F21V 21/02; F21V 21/16; F21V 21/0808; F21V 21/005; F21V 21/00; F21V 21/008; F21V 23/06

See application file for complete search history.

(56) References Cited

FOREIGN PATENT DOCUMENTS

| | | | | | |
|---|---|---|---|---|---|
| CN | 104879699 A | * | 9/2015 | ............. | F21S 8/061 |
| CN | 113390041 A | * | 9/2021 | | |
| CN | 116734225 A | * | 9/2023 | | |
| WO | WO-2019175913 A1 | * | 9/2019 | ................ | F21S 4/22 |

OTHER PUBLICATIONS

Innovation Q+ NPL Search (Year: 2024).*

* cited by examiner

*Primary Examiner* — Anabel Ton
(74) *Attorney, Agent, or Firm* — Bruce Stone LLP; Joseph A. Bruce

(57) ABSTRACT

A lighting device with easy installation functionality includes a light-emitting module, two lamp heads, and two lamp head clamps. The light-emitting module has a driver disposed therein. Each lamp head has a connection hole on one side thereof for connecting to one end of the light-emitting module. Each lamp head has a chamber disposed therein and communicating with the connection hole, and the inner wall of each lamp head is provided with a plurality of glue grooves. The two lamp head clamps are sleeved on the lamp heads respectively. The glue is applied inside the lamp heads to achieve sealing, and the glue grooves inside the lamp heads ensure waterproofing and safety reliability. Additionally, the lamp head clamps press tightly on the exterior of the lamp heads so as to effectively prevent sealing failure due to external environmental impacts.

10 Claims, 9 Drawing Sheets

LIGHTING DEVICE WITH EASY INSTALLATION FUNCTIONALITY

BACKGROUND OF THE INVENTION

1. Field of the Invention

The present invention relates to a lighting device, in particular to a lighting device with easy installation functionality.

2. Description of the Prior Art

Currently, most currently available plant lights are based on semiconductor lighting principles, specifically designed to supplement the growth of plants such as flowers or vegetables. Research has shown that the undersides of leaves, roots and stems are also beneficial for photosynthesis. However, for indoor plants such as flowers, over time, they grow taller and lusher, leading to some areas lacking light exposure, which affects their growth. In the currently available technology, LED plant growth lights use LEDS (light-emitting diodes) as the light source, providing artificial light conditions necessary for plant photosynthesis. Presently, some LED plant lights are primarily used in environments lacking sunlight, acting as sunlight to enable plants to grow and develop normally or better. In greenhouse environments where plants are grown, the lights frequently come into contact with water, necessitating that the lights have a certain degree of waterproof performance. Additionally, the lights need to be installed flexibly and conveniently.

SUMMARY OF THE INVENTION

One embodiment of the present invention provides a lighting device with easy installation functionality, which includes a light-emitting module, two lamp heads and two lamp head clamps. The light-emitting module has a driver disposed therein. Each lamp head has a connection hole on one side thereof for connecting to one end of the light-emitting module. Each lamp head has a chamber disposed therein and communicating with the connection hole. The inner wall of each lamp head is provided with a plurality of glue grooves. The lamp head clamps are sleeved on the lamp heads respectively.

In one embodiment, each lamp head is a sleeve, the sleeve is cylindrical and an outer ring surface of the sleeve is provided with a circular groove. Each lamp head clamp is sleeved on the circular groove corresponding thereto, and the lamp heads are made of rubber.

In one embodiment, each glue groove is an annular groove, and the annular grooves are arranged in a regular interval and formed on the inner wall of the lamp head.

In one embodiment, the lighting device further includes a plurality of hanging rings. The lamp head clamp is a circular ring and each of the two ends of the circular ring is provided with an extension piece. Each extension piece is provided with a lock hole and a screw is fastened in the lock hole. Each hanging ring is positioned within the circular ring of the lamp head clamp corresponding thereto.

In one embodiment, the other side of each lamp head is provided with a connector and a connecting wire connected to the connector. The connecting wire is connected to the connecting wire of another lighting device.

In one embodiment, the other side of each lamp head is further provided with a switch for controlling the on/off state of the lighting device or a plurality of the lighting devices.

In one embodiment, the lighting device further includes a plurality of fixing plates disposed inside the lamp heads respectively, and the switch is fixed on the fixing plate.

In one embodiment, the lighting device further includes a plurality of wire clamps. The wire clamps are sleeved on the connectors respectively.

In one embodiment, one end of each of the connecting wires is provided with a male plug or a female plug.

In one embodiment, the light-emitting module includes a light cover, the driver disposed inside the light cover, an aluminum profile, an emergency driver, and a light source board.

The lighting device with easy installation functionality in accordance with the embodiments of the present invention may have the following advantages:

The lighting device according to the embodiments of the present invention can serve as plant lights, which can achieve flexible installation in various plant growth environments. In actual use of plant lights, frequent contact with water requires a certain level of waterproof functionality. The interior of the lamp heads is sealed with glue, and the inner sides of the lamp heads have a plurality of glue grooves, ensuring safe and reliable waterproof sealing. Additionally, the exterior of the lamp heads is tightly secured with clamps, effectively preventing sealing failure caused by external environmental impacts. In some embodiments, the lighting device can be suspended from both ends using hanging rings, enabling easy disassembly and installation. In some embodiments, the lamp heads are made of rubber, providing aging resistance and impact resistance.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
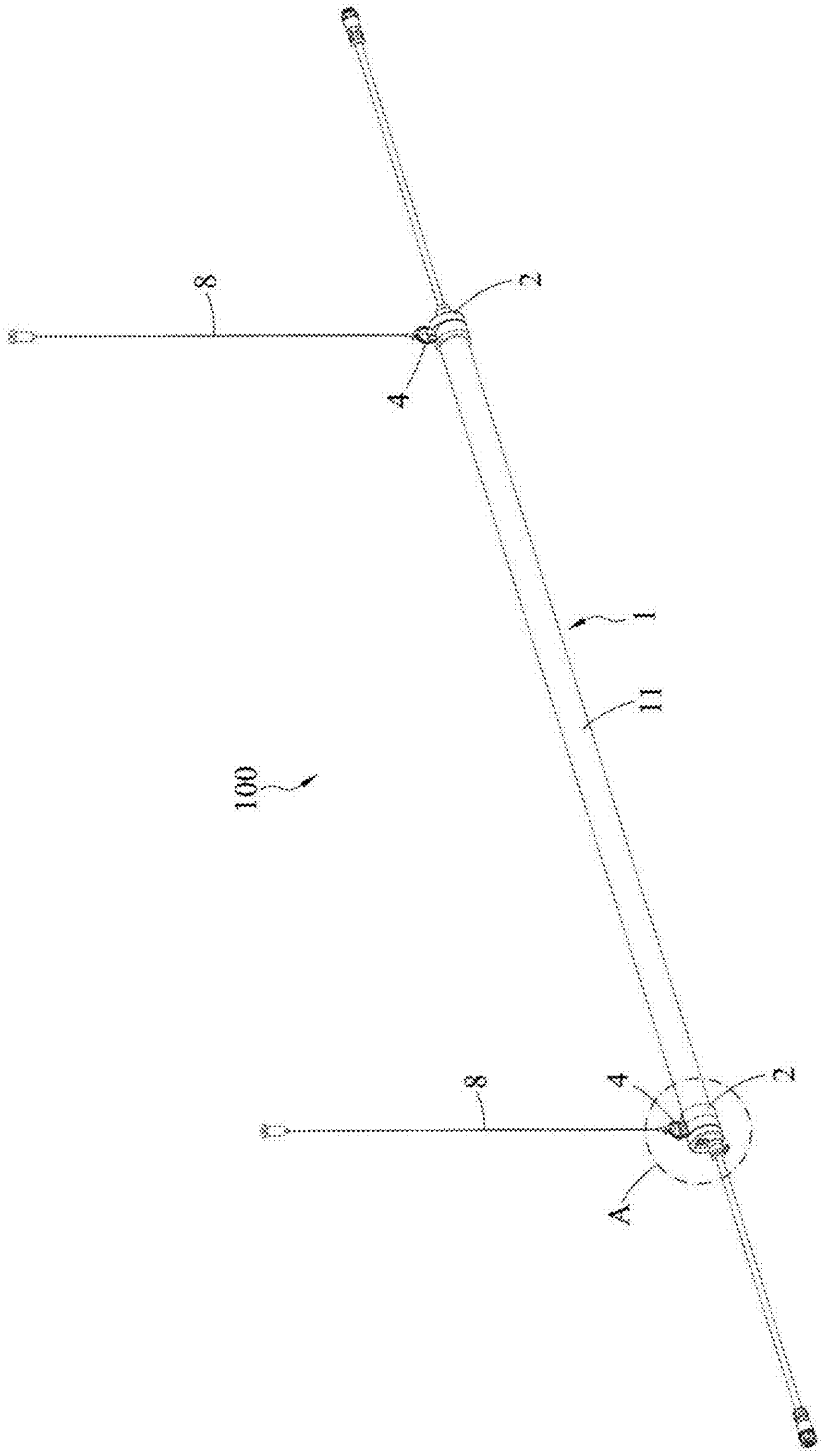
FIG. 1 is a schematic view of the appearance of a lighting device in accordance with one embodiment of the present invention.

The advantages and features of the present invention, as well as the methods to achieve them, will be described in more detail with reference to exemplary embodiments and the accompanying drawings, making them easier to understand. However, the present invention can be implemented in various forms and should not be construed as limited to the embodiments set forth herein. On the contrary, the provided embodiments will enable those skilled in the art to have a more thorough and comprehensive understanding of the disclosure and fully convey the scope of the utility model, with the invention being defined only by the appended claims. In the drawings, the sizes and relative sizes of components or elements are exaggerated for clarity and ease of understanding. Throughout the specification, the same reference numerals refer to the same components. As used hereinafter, the term "and/or" includes any and all combinations of one or more of the associated listed items.

Unless otherwise defined, all terms used hereinafter (including technical and scientific terms) have the same meaning as commonly understood by one of ordinary skill in the art. It should be understood that, for example, the terms defined in commonly used dictionaries should be interpreted as having meanings consistent with their contextual use in the relevant art, and unless explicitly defined hereinafter, they should not be interpreted in an overly idealized or overly formal sense.

The exemplary embodiments will be described in detail below with reference to the accompanying drawings. However, these embodiments can be included in different forms and should not be construed as limiting the scope of the invention. The provision of these embodiments ensures a complete and clear disclosure of the invention, allowing those skilled in the art to understand the scope of the invention through these embodiments.

Figure 2:
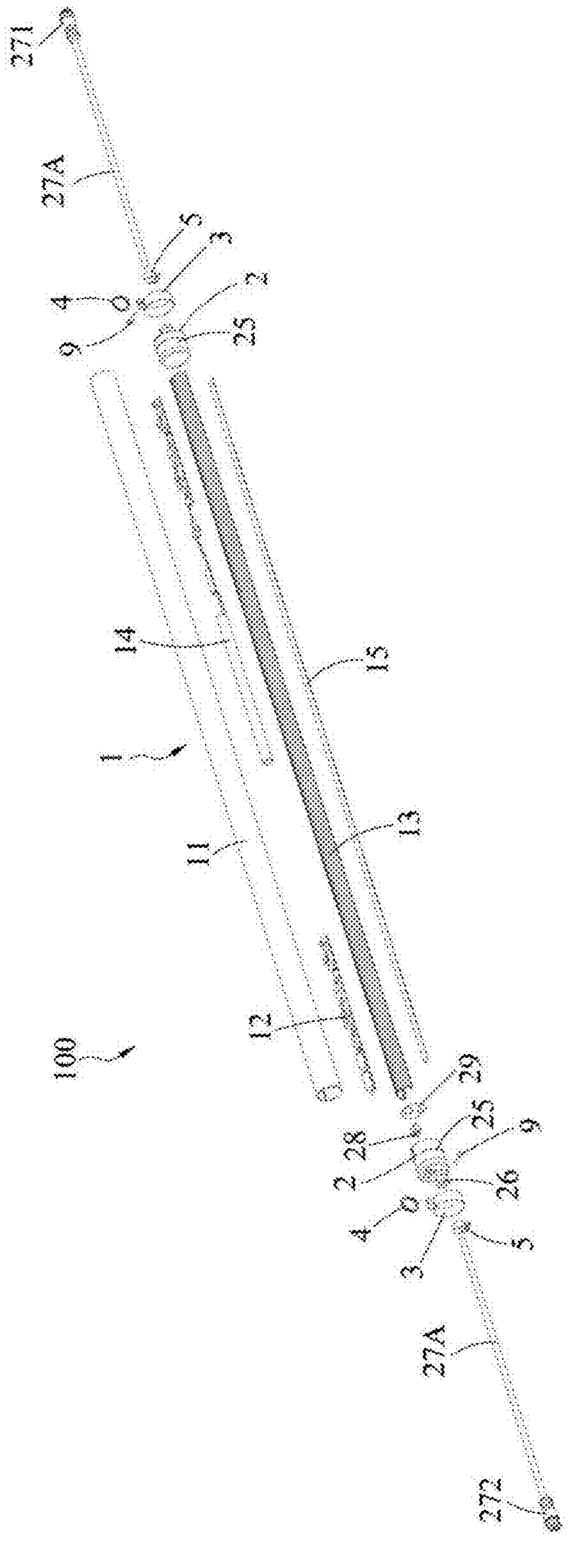
FIG. 2 is an exploded view of the lighting device in accordance with one embodiment of the present invention.

Please refer to FIG. 1 and FIG. 2. FIG. 1 is a schematic view of the appearance of a lighting device in accordance with one embodiment of the present invention. FIG. 2 is an exploded view of the lighting device in accordance with one embodiment of the present invention. As shown in FIG. 1 and FIG. 2, a lighting device 100 with easy installation functionality is disclosed, which includes a light-emitting module 1, two lamp heads 2, and two lamp head clamps 3. The light-emitting module 1 is provided with a driver 12 disposed therein. One side of each lamp head 2 has a connection hole 21 that connects to one end of the light-emitting module 1. Each lamp head 2 has a chamber 22 disposed therein and communicating with the connection hole 21. The inner wall of each lamp head 2 has a plurality of glue grooves 23 for applying glue. Each lamp head clamp 3 is sleeved on the lamp head 2 corresponding thereto.

The aforementioned light-emitting module 1 includes a light cover 11, a driver 12, an aluminum profile 13, an emergency driver 14, and a light source board 15. The driver 12 and the emergency driver 14 are electrically connected to the light source board 15. The aluminum profile 13 is a semi-circular aluminum extrusion, accommodating the light source board 15 and providing heat dissipation through the aluminum profile 13. The light cover 11 is used to cover the aluminum profile 13.

Figure 3:
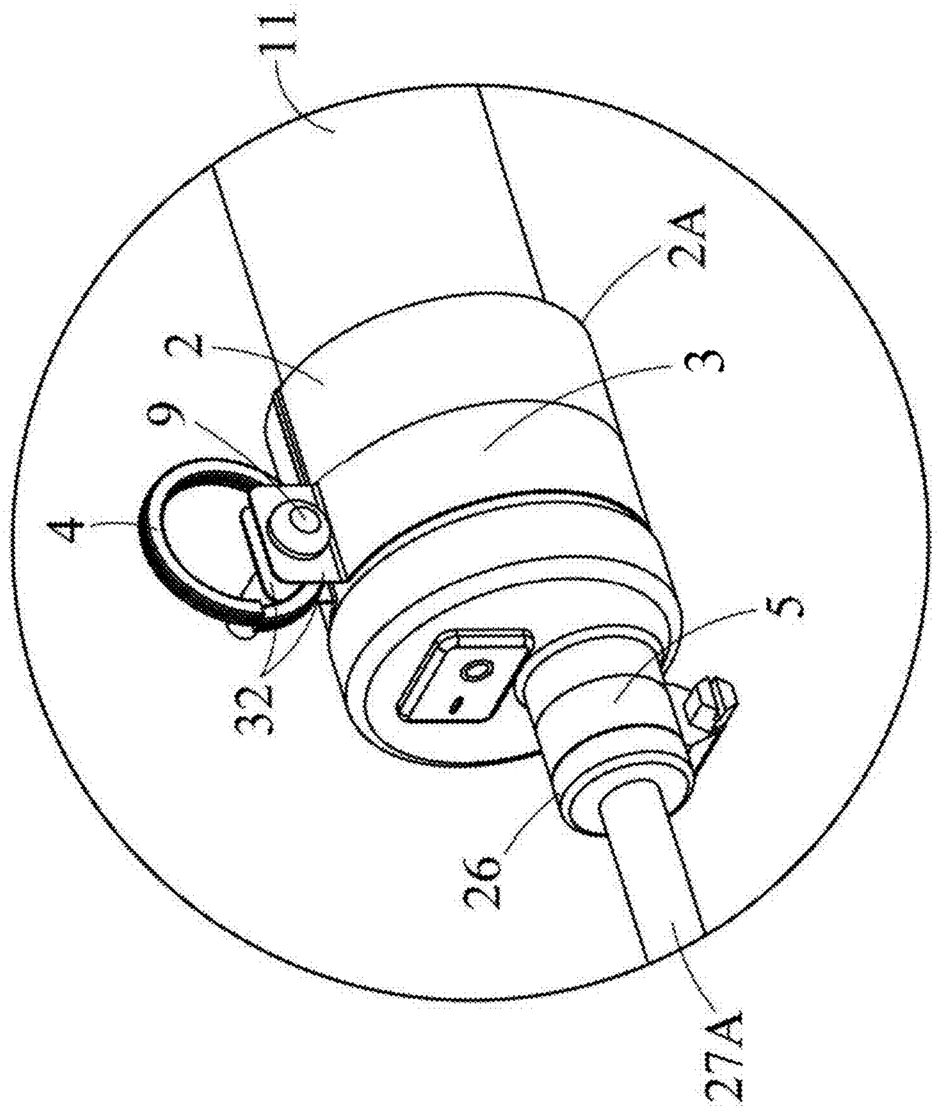
FIG. 3 is an enlargement view of the area A of FIG. 1.

Please refer to FIG. 2 and FIG. 3. FIG. 3 is an enlargement view of the area A of FIG. 1. In some embodiments, each lamp head 2 is a circular sleeve 2A and the outer ring surface of the sleeve 2A is provided with a circular groove 25. When the lamp head clamp 3 is installed on the exterior of the lamp head 2, the lamp head clamp 3 is sleeved on the circular groove 25. The lamp heads 2 are made of rubber.

Figure 4:
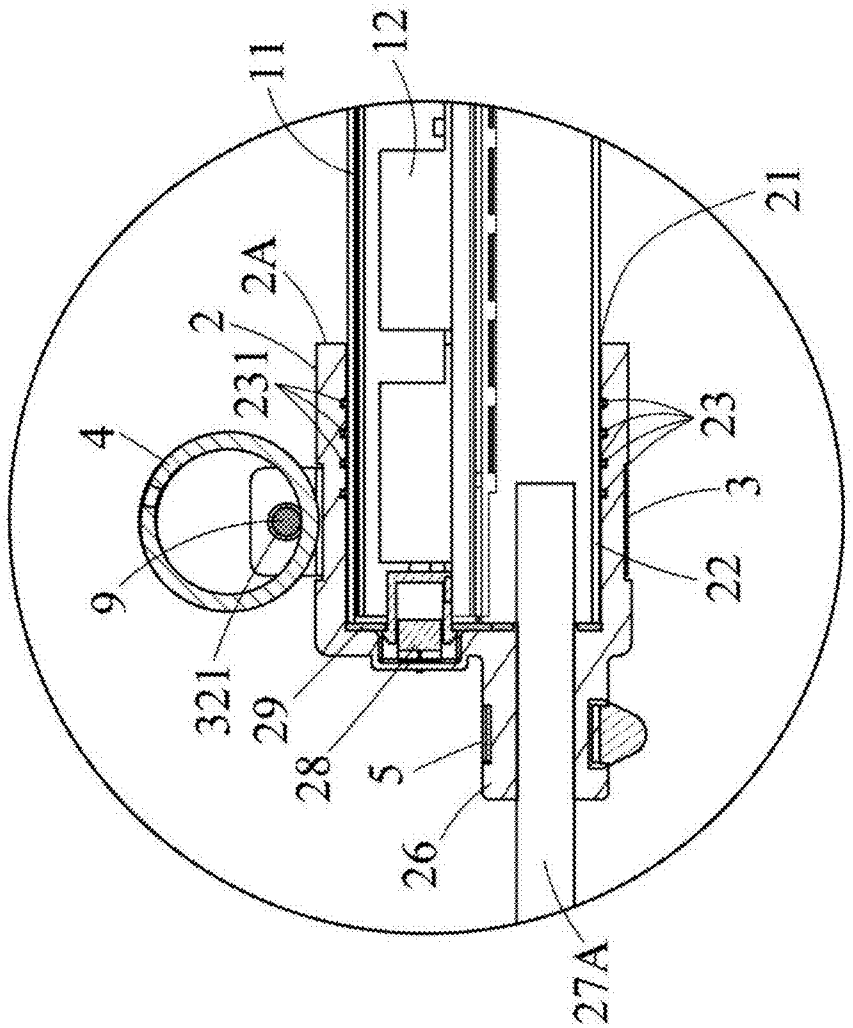
FIG. 4 is a sectional view of FIG. 3.

Please refer to FIG. 2 to FIG. 4. FIG. 4 is a sectional view of FIG. 3. In some embodiments, each lamp head clamp 3 is a circular ring with extension pieces 32 at both ends thereof. Each extension piece 32 has a lock hole 321. When the lamp head clamp 3 is installed on the exterior of the lamp head 2, the user can pull both arms of the circular ring first to separate both ends of the circular ring, allowing it to be sleeved on the lamp head 2, and the circular ring clamps the lamp head 2 exteriorly. This brings the two extension pieces 32 together, which are then locked with screws 9 through the lock holes 321. Additionally, the lighting device 100 includes a plurality of hanging rings 4, installed between the two extension pieces 32, with the hanging rings 4 being fixed above the lamp head 2 by screws 9.

Please refer to FIG. 2 to FIG. 4, in some embodiments, each glue groove 23 is an annular groove 231, and the annular groove 231 are disposed on the inner wall surface of each lamp head 2. the annular groove 231 are arranged in a regular interval and side by side. Before installing both ends of the light-emitting module 1 on each lamp head 2, the user needs to apply glue inside each lamp head 2 first, allowing the glue to settle in each glue groove 23. After installing both ends of the light-emitting module 1 on each lamp head 2, the glue seals the space between the light-emitting module 1 and the lamp head 2, ensuring secure waterproof sealing. At the same time, the lamp head clamps 3 compress the exterior of the lamp heads 2 with a view to effectively preventing poor sealing due to external environmental impacts.

Please refer to FIG. 2 to FIG. 4, in some embodiments, the other side of the lamp head 2 is provided with a switch 28, which can control the on/off state of a single lighting device 100 or multiple lighting devices 100. The lighting device 100 includes a fixing plate 29, which is disposed inside each lamp head 2, and the switch 28 is fixed on the fixing plate 29.

Figure 5:
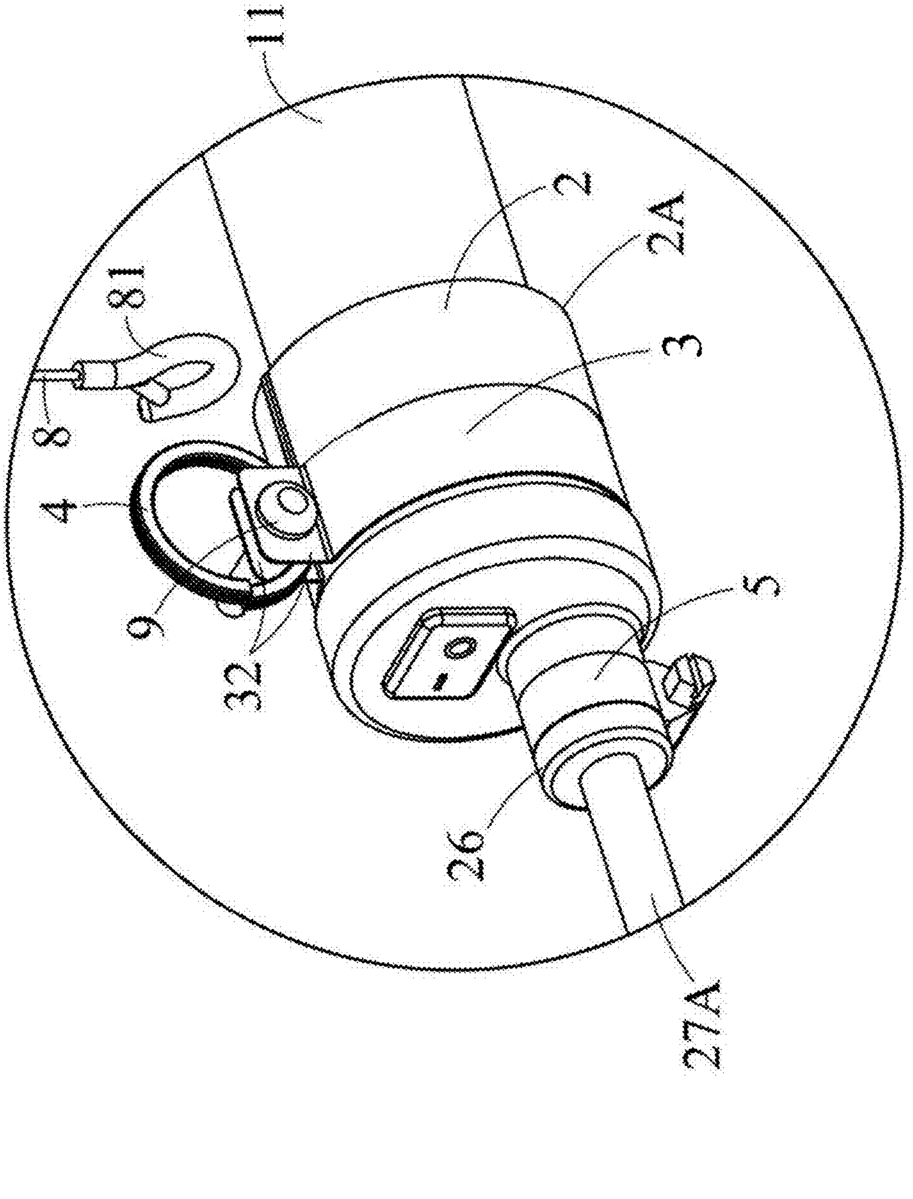
FIG. 5 is a schematic view of the lighting device before being installed with the hook of a hanging rope in accordance with one embodiment of the present invention.
Figure 6:
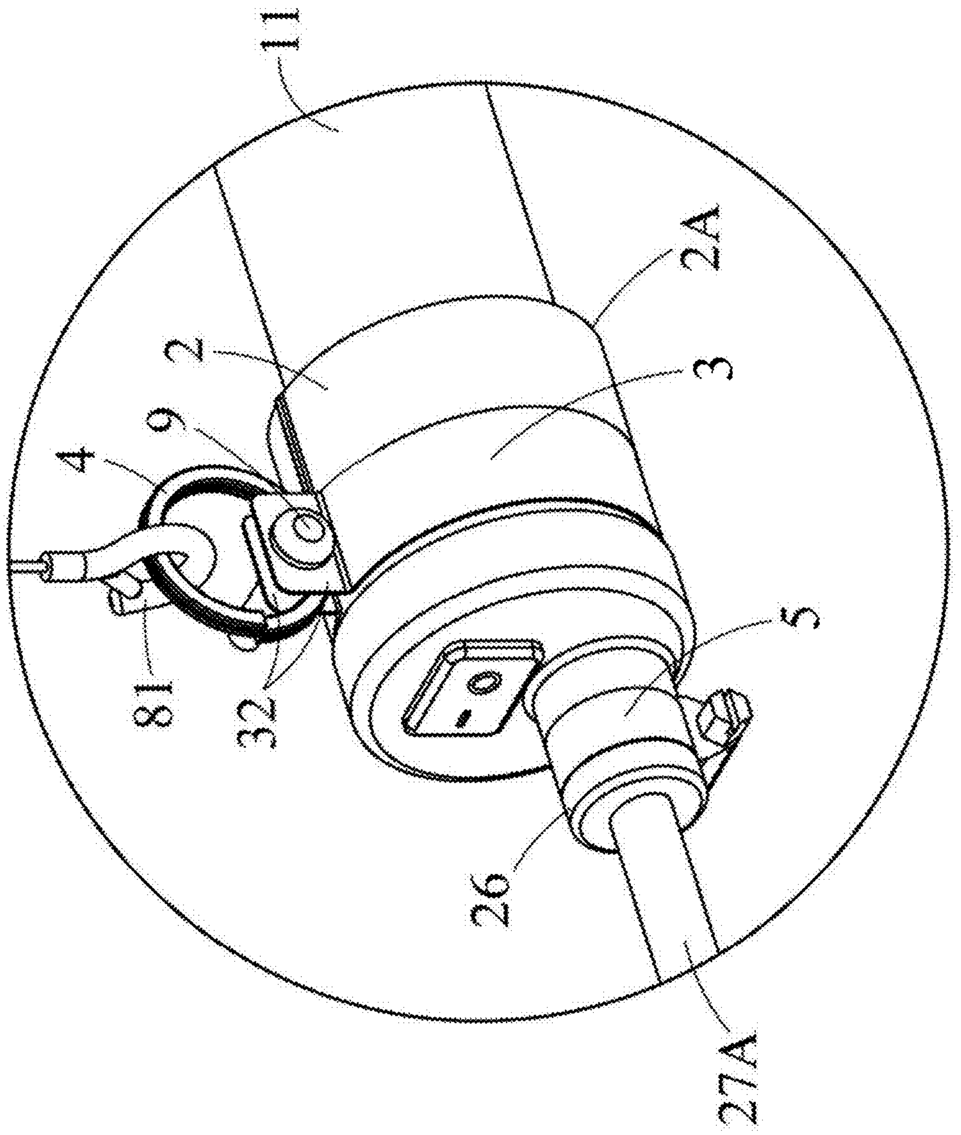
FIG. 6 is a schematic view of the appearance of the lighting device after being installed with the hook of the hanging rope in accordance with one embodiment of the present invention.

Please refer to FIG. 5 and FIG. 6. FIG. 5 is a schematic view of the lighting device before being installed with the hook of a hanging rope in accordance with one embodiment of the present invention. FIG. 6 is a schematic view of the appearance of the lighting device after being installed with the hook of the hanging rope in accordance with one embodiment of the present invention. In some embodiments, the hook 81 of the hanging rope 8 is used to hook the hanging ring 4, and the hanging rope 8 is installed on the ceiling to suspend the lighting device 100.

Figure 7:
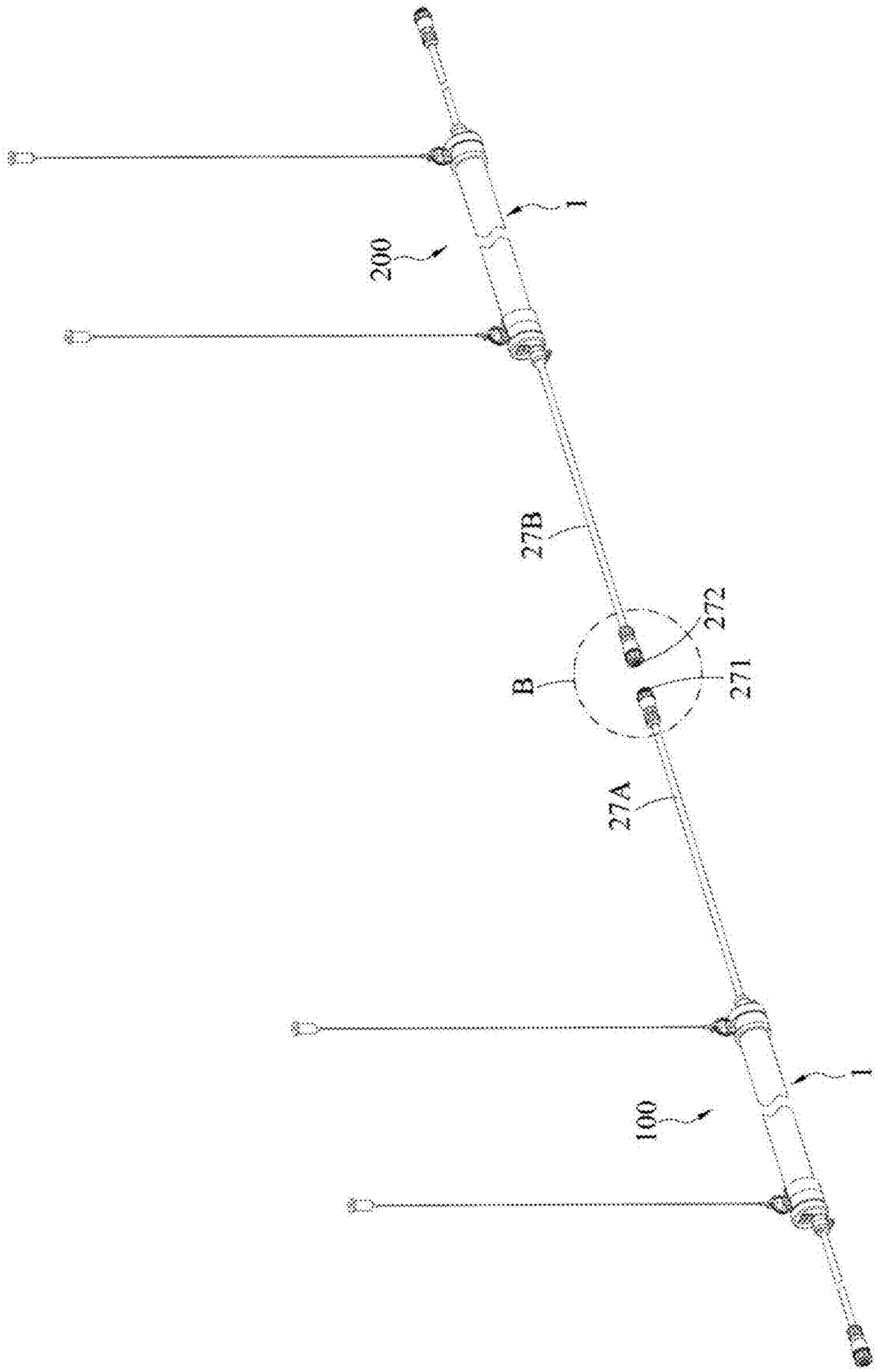
FIG. 7 is a schematic view of the lighting fixture before being connected to another lighting device in accordance with one embodiment of the present invention.
Figure 8:
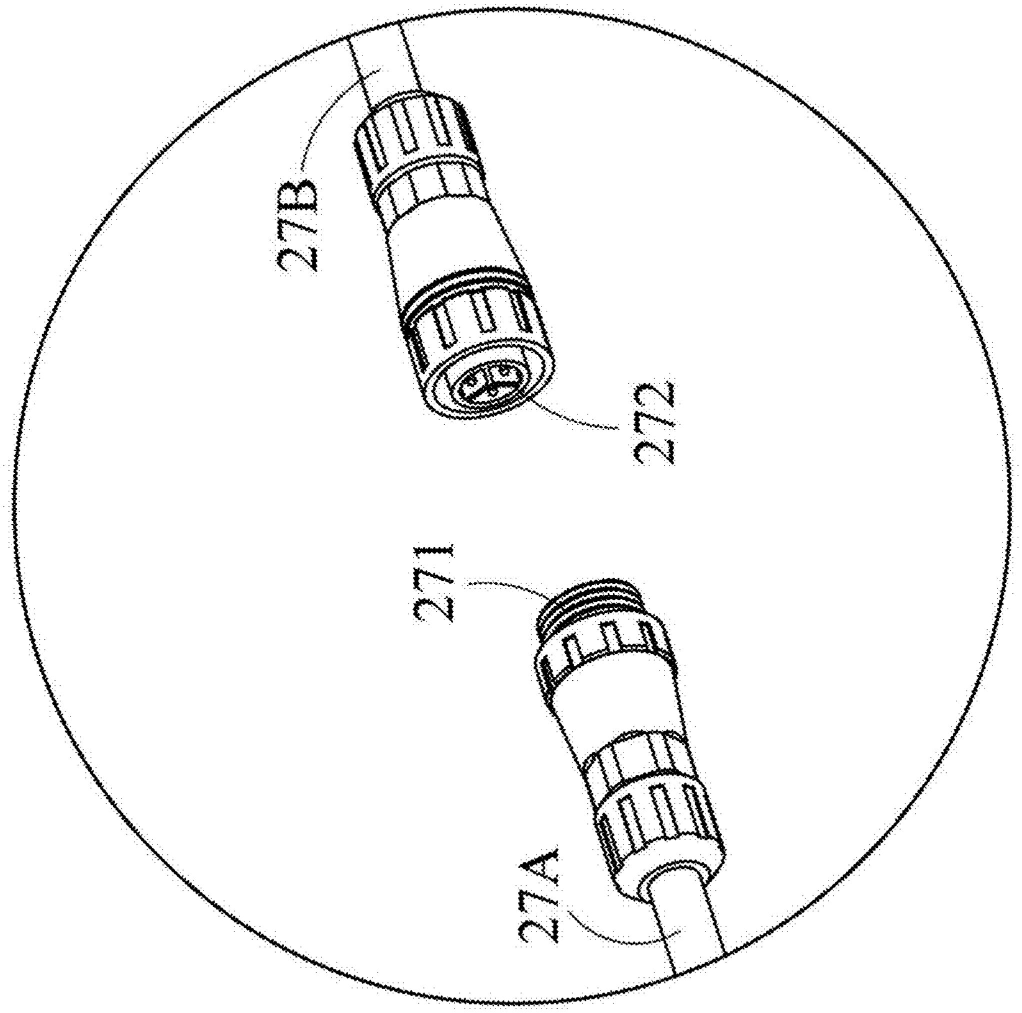
FIG. 8 is an enlargement view of the area B of FIG. 7.
Figure 9:
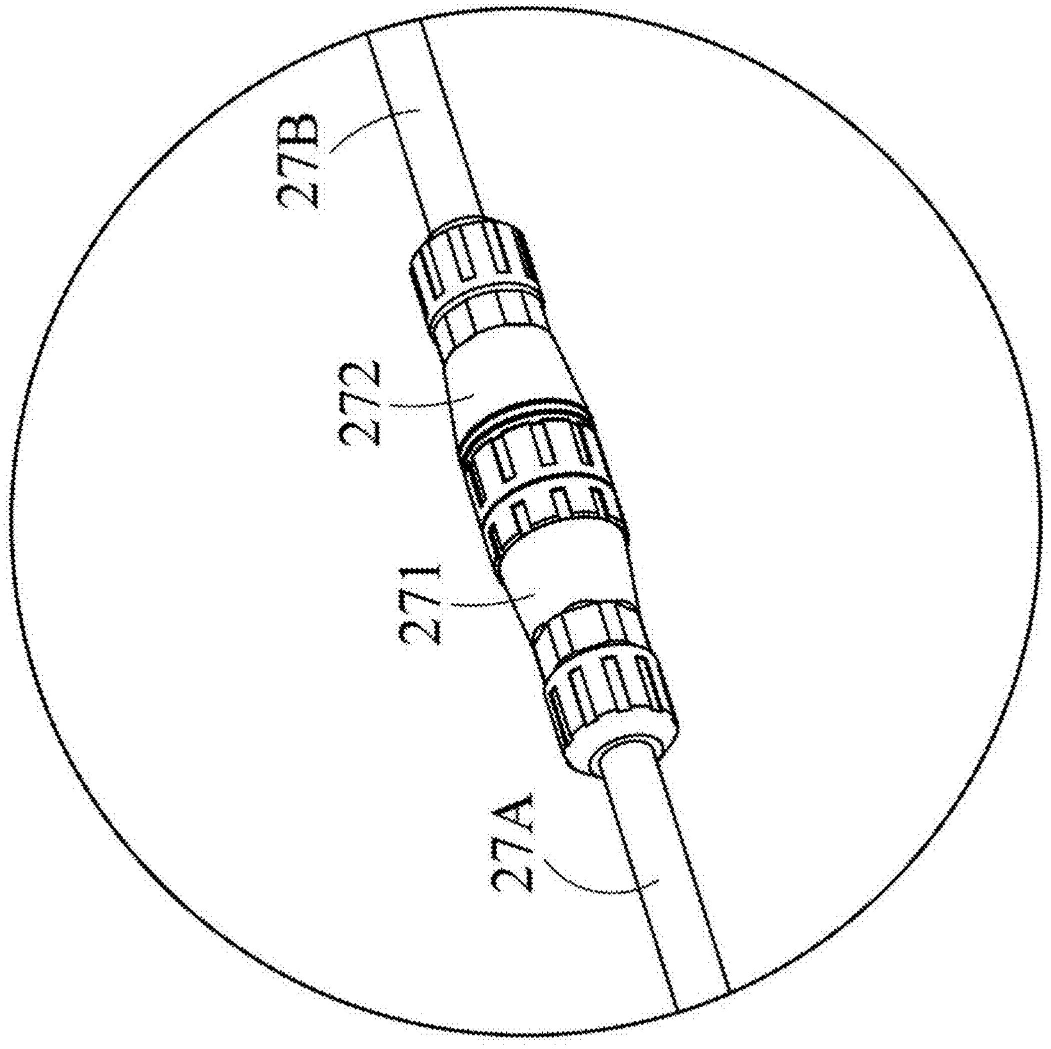
FIG. 9 is a schematic view of a male plug of the lighting fixture inserted into a female plug of another lighting device.

Please refer to FIG. 7 to FIG. 9. FIG. 7 is a schematic view of the lighting fixture before being connected to another lighting device in accordance with one embodiment of the present invention. FIG. 8 is an enlargement view of the area B of FIG. 7. FIG. 9 is a schematic view of a male plug of the lighting fixture inserted into a female plug of another lighting device. In some embodiments, the other side of each lamp head 2 has a connector 26 and a connecting wire 27A connected to the connector 26. The lighting device 100 includes a plurality of wire clamps 5, each of which is respectively sleeved on the connector 26 corresponding thereto. One end of each connecting wire 27A is provided with a male plug 271 or a female plug 272. The connecting wire 27A is used to serially connect the connecting wire 27B of another lighting device 200. In this way, the lighting device 100 can be electrically connected to another lighting device 200.

From the above, it can be understood that the lighting device according to the embodiments of the present invention can be applied to plant lights, providing flexible installation of the lighting device in various plant growth environments. In practical use of plant lights, they often come into contact with water and need to have a certain waterproof function. One embodiment of the present invention achieves waterproof safety and reliability by using multiple glue grooves inside the rubber lamp head for sealing and clamping the exterior with a clamp. Another embodiment of the present invention uses a hanging ring installation method, allowing for flexible installation and convenient disassembly. Another embodiment of the present invention uses a wire serial connection method to achieve the serial installation of multiple light tubes.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting device with easy installation functionality, comprising:

a light-emitting module having a driver disposed therein;

two lamp heads, each having a connection hole on one side thereof for connecting to one end of the light-emitting module, wherein each of the lamp heads has a chamber disposed therein and communicating with the connection hole, and an inner wall of each of the lamp heads is provided with a plurality of glue grooves; and two lamp head clamps being sleeved on the lamp heads respectively.

2. The lighting device with easy installation functionality as claimed in claim 1, wherein each lamp head is a sleeve, the sleeve is cylindrical and an outer ring surface of the sleeve is provided with a circular groove, wherein each of the lamp head clamps is sleeved on the circular groove corresponding thereto, and the lamp heads are made of rubber.

3. The lighting device with easy installation functionality as claimed in claim 1, wherein each of the glue grooves is an annular groove, and the annular grooves are arranged in a regular interval and formed on the inner wall of the lamp head.

4. The lighting device with easy installation functionality as claimed in claim 1, further comprising a plurality of hanging rings, wherein the lamp head clamp is a circular ring and each of the two ends of the circular ring is provided with an extension piece, wherein each of the extension pieces is provided with a lock hole and a screw is fastened in the lock hole, wherein each of the hanging rings is positioned within the circular ring of the lamp head clamp corresponding thereto.

5. The lighting device with easy installation functionality as claimed in claim 1, wherein another side of each of the lamp heads is provided with a connector and a connecting wire connected to the connector, wherein the connecting wire is configured to connect to a connecting wire of another lighting device.

6. The lighting device with easy installation functionality as claimed in claim 5, wherein another side of each of the lamp heads is further provided with a switch configured to control an on/off state of the lighting device or a plurality of the lighting devices.

7. The lighting device with easy installation functionality as claimed in claim 6, further comprising a plurality of fixing plates disposed inside the lamp heads respectively, and the switch is fixed on the fixing plate.

8. The lighting device with easy installation functionality as claimed in claim 5, further comprising a plurality of wire clamps, wherein the wire clamps are sleeved on the connectors respectively.

9. The lighting device with easy installation functionality as claimed in claim 5, wherein one end of each of the connecting wires is provided with a male plug or a female plug.

10. The lighting device with easy installation functionality as claimed in claim 1, wherein the light-emitting module comprises a light cover, the driver disposed inside the light cover, an aluminum profile, an emergency driver, and a light source board.

* * * * *